United States Patent [19]

Sayles

[11] Patent Number: 4,574,132

[45] Date of Patent: Mar. 4, 1986

[54] GENERAL PURPOSE EXPANDABLE ADHESIVE

[75] Inventor: David C. Sayles, Huntsville, Ala.

[73] Assignee: The United States of America as represented by the Secretary of the Army, Washington, D.C.

[21] Appl. No.: 669,919

[22] Filed: Nov. 9, 1984

[51] Int. Cl.$^4$ .............................................. C08K 3/36
[52] U.S. Cl. .................... 523/466; 525/415; 528/103; 528/106
[58] Field of Search ................ 525/415; 528/106, 103; 523/466

[56] References Cited

U.S. PATENT DOCUMENTS

| | | | |
|---|---|---|---|
| 2,962,524 | 11/1960 | Hostettler et al. | 528/366 X |
| 3,294,743 | 12/1966 | Mack | 528/103 X |
| 3,370,104 | 2/1968 | O'Brien et al. | 528/106 |
| 3,445,409 | 5/1969 | D'Agostino | 528/106 |
| 3,595,970 | 7/1971 | Nolken | 528/103 |
| 3,892,821 | 7/1975 | Koleske et al. | 525/415 X |
| 3,925,504 | 12/1975 | Koleske et al. | 525/415 |
| 3,951,769 | 4/1976 | Schlesinger | 528/106 X |
| 3,960,785 | 6/1976 | Babcock | 523/466 X |

FOREIGN PATENT DOCUMENTS 2909463  9/1979  Fed. Rep. of Germany ...... 525/415

OTHER PUBLICATIONS

Chem. Abstr. 67, 54117v (1967).
Chem. Abstr. 63, 11732h (1965).
Chem. Abstr. 65, 4052g (1966).
Chem. Abstr. 72, 5609n (1970).
Bailey, W. J. et al., Journal of Poly. Sc: Poly. Chem. Ed., vol. 14; pp. 1735-1741, (1976).

Primary Examiner—Paul R. Michl
Attorney, Agent, or Firm—Anthony Thomas Lane; Robert P. Gibson; Jack W. Voigt

[57] ABSTRACT

A general purpose expandable adhesive comprised of a spiroortho ester synthesized from the lactone, 6-caprolactone, and the diglycidyl ethers of bisphenol A and 1,4-butanediol, Cab-o-Sil thickener/thixotrope, silica (325 mesh), and Unirez 2800, amidoamino curing agent, has superior tensile strength, superior bondability and with less void formation to aluminum, steel, wood, and cured concrete as compared with a general purpose adhesive which does not contain a spiroortho ester.

2 Claims, No Drawings

GENERAL PURPOSE EXPANDABLE ADHESIVE

DEDICATORY CLAUSE

The invention described herein may be manufactured, used, and licensed by or for the Government for governmental purposes without the payment to me of any royalty thereon.

BACKGROUND OF THE INVENTION

General purpose adhesives generally undergo shrinkage when curing. As a result of shrinkage large stresses are built up in the adhesive matrix. Thus, when shrinkable adhesives are used to join similar or dissimilar materials, particularly in combination with a reinforcing material (which has a high modulus) which cannot undergo shrinkage, large stresses are built up in the adhesive matrix portion. These stresses can only be relieved by failure of the adhesive matrix, and the matrix then pulls away from the reinforcing material or it undergoes cohesive failure producing void formation or microcracking.

An object of the invention is to provide a general purpose adhesive which undergoes expansion on cure in contrast to the usual adhesive which undergoes shrinkage under the same usage conditions.

Another object of this invention is to provide a spiroortho ester as a comonomer for the epoxy resin which is used in the manufacture of these general purpose adhesives.

A further object of this invention is to provide a general purpose adhesive formula so that the resulting bond that is produced between the adherents are bonded much more securely to achieve an adhesive matrix that is substantially void and stress-free.

SUMMARY OF THE INVENTION

The general purpose expandable adhesive of this invention is comprised in parts by weight of about 6.0–12.0 parts of a spiroortho ester which is synthesized from the lactone, 6-caprolactone, about 74.0 parts of diglycidyl ether of bisphenol A (Epon 828)*, about 8.4 parts of diglycidyl ether of 1,4-butanediol, about 3.8 parts of mineral filler which serves as thickener/thixotrope, about 14.8 parts of silica (325 mesh), and about 37.0 parts of Unirez 2800, as amidoamine curing agent. The incorporated spiroortho ester monomer which undergoes copolymerization with the epoxy resin produces a product which has substantially zero shrinkage, and which results in a near strainfree adhesive bond. As a result of the expansion that the monomer undergoes, during curing, the copolymerized product forces its way into crevices that it would otherwise not penetrate to produce a better bond. This adhesive is applicable for bonding wood, aluminum, steel, etc.

DESCRIPTION OF THE PREFERRED EMBODIMENT

The spiroortho ester employed in the general purpose expandable adhesive of this invention is a copolymerized product of a lactone and an epoxy blend consisting of the diglycidyl ether of Bisphenol A and the diglycidyl ether of 1,4-butanediol. A representative lactone is 6-caprolactone:

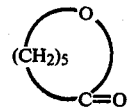

which is copolymerized with the diglycidyl ether of Bisphenol A and the diglycidyl ether of 1,4-butanediol Table I, set forth below, depicts the additional composition ingredients of a general purpose adhesive with which the spiroortho ester of this invention is employed to produce bonding properties of higher tensile strength and with reduced void formations, and having improved chemical resistance, heat distortion, and thixotropic properties.

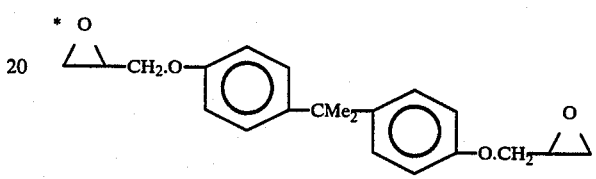

Diglycidyl Ether of Bisphenol A (EPON 828)

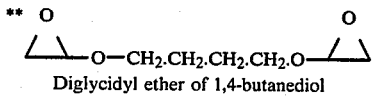

Diglycidyl ether of 1,4-butanediol

TABLE I
Comparison of General Purpose Adhesives Modified With a Spiroortho Ester

| Composition/Properties | Adhesive A | Adhesive B |
|---|---|---|
| Composition | | |
| Diglycidyl ether of bisphenol A | 74.0 | 74.0 |
| Diglycidyl ether of 1,4-butanediol | 7.4 | 7.4 |
| Cab-O-Sil (Silica Thickener/Thixotrope) | 3.8 | 3.8 |
| Silica (325 Mesh) | 14.8 | 14.8 |
| Spiroortho ester | 0 | 10.0 |
| Unirez 2800 (amidoamine Curing Agent) | 37.0 | 37.0 |
| Properties | | |
| Gel Time (@ 25° C.) (min) | 100 | 90 |
| Bondability of aluminum | ++ | ++++ |
| steel | ++ | +++ |
| wood | ++ | +++++ |
| cured concrete | ++ | ++++ |
| Shore D Hardness (1 week @ 25° C.) | 80 | 95 |
| Tensile Strength (psi) | 8590 | 8900 |
| Tensile Elongation (%) | 6 | 9 |
| Heat Distortion Temperature (°C.) | 61 | 69 |
| Izod Impact (ft-lbs/in of notch) | 0.44 | 0.57 |
| Void Content (%) | 20 | 1–4 |

On polymerization of the simplest of the spiroortho esters, an ether-containing polyester is produced, and this translates to lowering of the glass transition point which is a beneficial characteristic of adhesives.

Reaction of the lactone with a polyepoxide results in the introduction of additional crosslinks. This raises the glass transition temperature, and the amount of positive expansion that can be obtained on curing which counteracts the shrinkage that the Epon 828 or other epoxy would normally undergo.

The larger the ring size of the spiroortho esters, the greater is the amount of expansion that will occur on polymerization because of the ring opening which occurs.

The benefits that accrue in high-strength adhesives, when they undergo expansion on polymerization, is illustrated by the behavior of water. Water undergoes an expansion of volume of about 4% when it freezes. When this occurs, ice has been found to adhere strongly to almost any surface, including Teflon, by micromechanical interaction and not by wetting since water does not wet the Teflon.

In any composite material, the reinforcing material (which has a high modulus) cannot undergo shrinkage, and as a consequence, large stresses are built up in the adhesive matrix. These stresses can only be relieved by failure of the adhesive matrix, and the matrix then pulls away from the reinforcing material or it undergoes cohesive failure producing void formation or microcracking.

In the instant invention, the incorporation of the spiroortho ester monomer which undergoes copolymerization with epoxy resin achieves almost zero shrinkage, and produces a near strain-free adhesive bond. As a result of the expansion that the monomer undergoes, it forces its way into crevices that it would otherwise not penetrate, and produces a better bond. The expansion of the spiroortho ester has an off-setting effect to the shrinkage of the Epon 828 epoxy resin. Therefore, a general purpose adhesive modified with a spiroortho ester as shown in Table I meets a wide range of requirements for bondability to aluminum, steel, wood, and cured concrete as evidenced by the properties compared in Table I for adhesives A and B, the control general purpose adhesive and the experimental general purpose adhesive as modified with a spiroortho ester respectively. The spiroortho ester can vary from about 6 to about 12 parts when the other ingredients are held constant as illustrated in Table I. However, for a zero shrinkage general adhesive the spiroortho ester can be adjusted to exactly offset the shrinkage of the epoxy resins.

Reaction equation I below shows the general reaction synthesis of spiroortho esters.

Reaction Equation I -
General Formula for the Synthesis of Spiroortho Esters

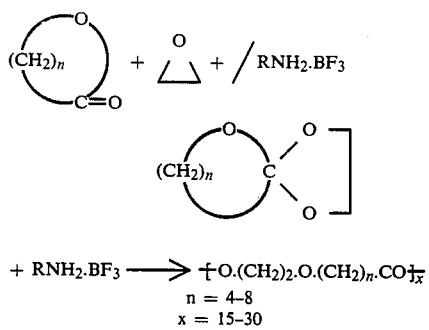

Reaction equation II below shows the reaction synthesis for the expandable additive of this invention for modifying the general purpose adhesive formulation A of Table I to produce the improved general purpose adhesive formulation B of Table I.

Reaction Equation II -
Expandable Additive for General Purpose Adhesives

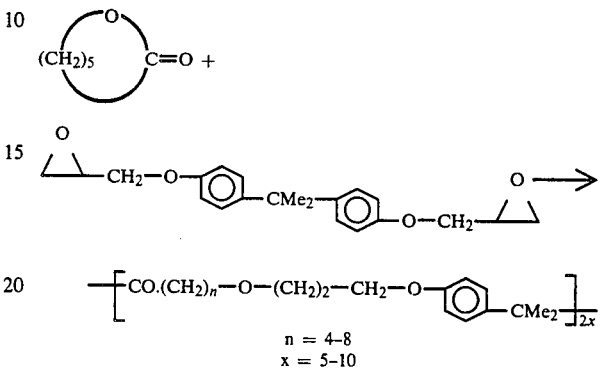

I claim:

1. A general purpose expandable adhesive having bonding properties of improved tensile strength and with reduced void formations, improved chemical resistance, improved heat distortion, and improved thixotropic properties, said general purpose expandable adhesive comprising, in parts by weight a first portion comprised of about 74 parts of diglycidyl ether of bisphenol A, about 7.4 parts of diglycidyl ether of 1,4-butanediol, about 3.8 parts of submicroscopic silica thickener thixotrope, about 14.8 parts of silica of about 325 mesh particle size, about 37.0 parts of an amidoamine curing agent, and of a second portion comprised of from about 6 to about 12 parts of the copolymerized product of the monomer of 6-caprolactone and the diglycidyl ethers of bisphenol A and 1,4-butanediol; said first portion undergoing shrinkage during curing while said second portion is undergoing expansion during curing as a result of the expansion that said monomer of 6-caprolactone undergoes and as a result forces its way into crevices that would not be penetrated with said first portion that undergoes shrinkage, thereby producing a near strain-free adhesive bond as a result of the reaction of said first portion with said second portion whereby shrinkage of said first portion is offset by expansion of said second portion to prevent stress buildup in the adhesive matrix comprised of said first portion and said second portion of said general purpose expandable adhesive.

2. The general purpose expandable adhesive as set forth in claim 1 wherein said copolymerized product of 6-caprolactone and the diglycidyl ethers of bisphenol A and 1,4-butanediol is present in an amount of about 10 parts by weight.

* * * * *